United States Patent Office 3,271,321
Patented Sept. 6, 1966

3,271,321
RESINS HOMOGENEOUSLY BRIGHTENED WITH BIS-STYRYLBENZENES
Walter Stilz and Horst Pommer, Ludwigshafen (Rhine), Erika Wolff, Heidelberg, and Heinz Fessmann, Ludwigshafen (Rhine), Germany, assignors to Badische Anilin- & Soda-Fabrik Aktiengesellschaft, Ludwigshafen am Rhine, Germany
No Drawing. Filed June 20, 1960, Ser. No. 37,058
Claims priority, application Germany, June 24, 1959, B 53,723
20 Claims. (Cl. 252—301.2)

This invention relates to macromolecular organic substances containing small amounts of certain 1,4-bis-styrylbenzenes as optical brighteners.

The homogeneous brightening of synthetic, semisynthetic and natural macromolecular substances with optically brightening compounds presents technicians with far more difficult problems than the brightening of substrates with the aid of, for example, treatment baths or by simple incorporation, i.e., blending. The conditions under which treatment baths are used or conventional mixing or blending is carried out are relatively mild. The optically brightening compound comes to lie practically only one the surface of the substrate. If in course of time an optical brightening agent on a substrate becomes inactive, it can in general be removed and/or replaced by fresh treatment with fresh brightener. Any defective parts formed during the treatment can be readily corrected. It is much more difficult, however, to brighten macromolecular substances homogeneously with satisfactory and sufficiently lasting effect. If an optical brightening compound is incorporated, for example with a monomeric polymerizable initial material or precondensate, in order that the end product may be completed by allowing reaction to macromolecules to take place, the optical brightening compound is necessarily subjected to energetic conditions and also often exposed to the influence of very reactive chemical reagents. The homogeneous incorporation of optical brightening compounds into the finished macromolecular substances also exposes the optical brightening compound to far higher stress than is the case in the conventional application of such compounds to substrates. The consequence is damage to the optical brightening compound by complete or partial decomposition. The injurious influence may also become evident in the fact that the optical brightening compound very soon changes into inactive products which not only no longer impart any brightening to the macromolecular substances but may even make them particularly unattractive. The removal of such undesirable products from the finished material is just as impossible as a fresh treatment for homogeneous brightening.

It is an object of the present invention to provide new compounds which are especially well suited to the optical brightening of macromolecular organic substances because they give a very durable brightening effect and are very stable. Another object of the invention is to provide homogeneous and very stable optically brightened macromolecular organic substances. An especially important object of the invention is to provide optically brightened macromolecular substances in which the optical brightening compounds adhere very firmly to the macromolecular substances.

These and other objects and advantages of the invention are achieved by 1,4-bis-styrylbenzenes which are substituted on the phenyl radicals of the styryl groups by free carboxyl groups, derivatives of carboxyl groups and/or nitrilo groups, and by macromolecular substances with which the said 1,4-bis-styrylbenzenes have been homogeneously incorporated.

1,4-bis-styrylbenzene has the formula:

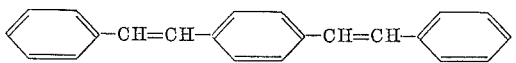

The optically brightening 1,4-bis-styrylbenzenes according to the present invention can be represented by the general formula:

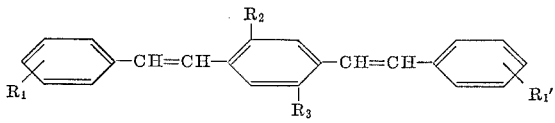

In this formula $R_1$ and $R_1'$ represent identical or different symmetrically or unsymmetrically attached substituents of the above-mentioned kind, preferably carboxyl groups, esterified carboxyl groups, nitrile groups, carboxylic acid amide groups or substituted carboxylic acid amide groups; $R_2$ and $R_3$ represent substituents of the kind with which the maximum or maxima of the ultraviolet absorption (bands of highest extinction, measured in dioxane) do not exceed 380 millimicrons and the primary maxima of the fluorescence spectrum (measured in dioxane) lie between 390 and 450 millimicrons. Such substituents include hydrogen, halogen, alkyl groups, aralkyl groups or alkoxy groups. $R_2$ and $R_3$ may be identical or different.

The carboxyl groups represented by $R_1$ and $R_1'$ may be esterified with lower alcohols. Aliphatic alcohols with 1 to 4 carbon atoms are preferred and these give the methyl, ethyl, propyl, isopropyl, butyl and the isomeric butyl esters. Cyclohexanol is also an alcohol suitable for the esterification. Glycols, for example, ethylene glycol and propylene glycol may similarly be used for the esterification. The alkyl groups of the esters are then substituted by hydroxy groups. The carboxylic acid amide groups, for which $R_1$ and $R_1'$ may also stand, may be unsubstituted on nitrogen or may contain one or two substituents on the nitrogen. As substituents there are preferred low aliphatic radicals, namely the methyl, ethyl, propyl, isopropyl and the butyl radicals. As in the case of the ester groups, there may be a cyclohexyl radical on the nitrogen. The amide nitrogen may also be part of a heterocyclic compound, as for example is the case in pyrrolidine, piperidine and morpholine. The substituents of the amide nitrogen may also bear hydroxyl groups. The ester radicals and the substituents on the amide nitrogen which are preferred may be described comprehensively as aliphatic radicals with 1 to 6 carbon atoms, it being understood that a cycloaliphatic radical is included in the term radical with 6 carbon atoms.

More precisely, $R_1$ and $R_1'$ may for example represent:

—COOH, —COOCH$_3$, —COOC$_2$H$_5$, —COOC$_3$H$_7$
—COOC$_4$H$_9$, —COOC$_6$H$_{11}$, —CONH$_2$, —CONHCH$_3$
—CONHC$_2$H$_5$, —CONHC$_3$H$_7$, —CONHC$_4$H$_9$
—CONHC$_6$H$_{11}$, —CON(CH$_3$)$_2$, —CON(C$_2$H$_5$)$_2$
—CON(C$_3$H$_7$)$_2$; and —CON(C$_4$H$_9$)$_2$ The phenyl radicals may contain more than one radical $R_1$ and $R_1'$. The radicals may be identical or different.

From the general and special possibilities for $R_1$ and $R_1'$ herein enumerated it may be seen that by derivatives of carboxyl groups in the sense of this invention there are meant above all carboxylic acid ester and carboxylic acid amide groups. These groups are, besides the free carboxyl groups and the nitrile groups, preferred and especially suitable for carrying out the invention because the 1,4-bis-styrylbenzenes substituted in the said way combine especially firmly with polyamides, polyesters and other synthetic high molecular weight products. It is emphasized here that it is of no decisive importance for the high industrial value of the optical brighteners and the macromolecular organic products brightened therewith whether the carboxyl groups are esterified, with what they are esterified, whether they are amidated and by what the amide groups are substituted. For technical reasons there are preferred 1,4-bis-styrylbenzenes which contain the substituents $R_1$ and $R_1'$ in para-position to the vinyl group. However, 1,4-bis-styrylbenzenes containing the above-mentioned substituents in ortho or meta position also give very useful optically brightened macromolecular organic compounds.

Examples of suitable radicals $R_2$ and $R_3$ include methyl, ethyl, propyl, isobutyl, butyl, the corresponding alkoxy or benzyl groups or the halogens fluorine, chlorine and bromine. $R_2$ and $R_3$ may therefore include aliphatic radicals, especially alkyl radicals with 1 to 4 carbon atoms, as well as hydrogen. The methyl radical may be substituted by a phenyl radical and thus give the benzyl radical described above. All these radicals and the halogens, for which $R_2$ and $R_3$ are likewise the symbols, are termed inert radicals in the sense of the present invention.

By the term macromolecular organic compounds as used in this specification there are to be understood compounds which are obtained by synthesis by converting a large number of compounds of low molecular weight which are polymerizable, condensable or capable of addition, by polymerization, polycondensation or polyaddition into compounds of high molecular weight. Preferred macromolecular organic compounds are polyamides and polyesters, i.e., compounds in which the radical of compounds of low molecular weight are attached to each other through —CON—, —CONH— and —COO— groups. Other macromolecular compounds preferred for the purposes of the present invention are condensation products derived from nitrogenous compounds and aldehydes or compounds which split off aldehydes, as for example so-called urea resins. Natural macromolecular substances such as rubber also fall within the ambit of the present invention. By semi-synthetic macromolecular compounds we understods, e.g., regenerated cellulose, so-called hydrate cellulose, or viscose.

Polyamides are obtained in the usual way, for example from polyamide-forming compounds, such as caprolactam, oenanthic lactam, capryllic lactam, the systems adipic acid/hexamethylene diamine, suberic acid/hexamethylene diamine, heptadecane dicarboxylic acid/hexamethylene diamine, adipic acid/octamethylene diamine, suberic acid/octamethylene diamine or mixture of such polyamide-forming compounds.

Polyesters may be obtained in the usual way, for example from polyester-forming compounds, such as dimethyl terephthalate and glycol or from dimethyl terephthalate and para-dimethyllolcyclohexane.

By macromolecular organic substances in connection with the optical brighteners there are also to be understood condensation products of aldehydes and compounds containing amino or amido groups. Such condensation products are obtained for example from precondensates of urea and formaldehyde, i.e., methylol derivatives of urea, from precondensates of melamine and formaldehyde, i.e., methylol compounds of melamine, or from precondensates of aliphatic dicarboxylic acid amides with formaldehyde, i.e., dimethylol derivatives of dicarboxylic acid amides. Polymers and copolymers of polymerizable compounds containing double linkages, such as styrene, vinyl chloride, vinylidene chloride, butadiene, acrylic acid derivatives, as for example acrylic acid esters, acrylamides or acrylonitrile, and also polyolefines, such as polyethylene, polypropylene and polyisobutylene, also belong to the macromolecular organic compounds which can be brightened optically according to this invention. Thermoplastic polyformaldehyde is also included within the term macromolecular organic substances in the sense of this invention. The molecular weights which the macromolecular substances may have are known among experts and are frequently specified in literature concerning the chemistry of plastic compositions and plastics. It is therefore not necessary for understanding the invention to give numerical examples of molecular weights of macromolecular substances falling within the scope of the present invention.

The homogeneously optically brightened macromolecular substances can be obtained by adding the optical brightener to the monomeric compound or precondensation product convertible into a macromolecular substance and converting the mixture into the macromolecular finished product or homogeneously incorporating the optical brightener in the macromolecular substance.

The low molecular weight initial materials or precondensates with which the optical brightening compounds have been mixed may be converted, depending on their properties, into the macromolecular substances by the usual methods of polymerization, polycondensation or polyaddition.

For incorporation of the optical brightening compounds into synthetic macromolecular products, such as polyacrylonitrile, there are suitable for example solutions thereof from which, after mixing with the optical brightening compound, the solvent is removed. Thermoplastic high molecular weight compounds, as for example polyolefines, may have the optical brightening compounds incorporated therewith for example by calendering, preferably in the form of so-called master batches. These concentrates may in turn be obtained from the optical brightening compounds and the monomers in the above-mentioned way. The optical brighteners may also be incorporated in latices or crude rubber.

The optically brightened macromolecular substances may contain plasticizers and other additives, as for example fillers, pigments and dyes. Two or more of the optical brighteners comprised within the invention may also be used in admixture.

The strength of the optical brightening compounds is up to ten times as great as that of those hitherto known. It is therefore possible to achieve the desired effects with as small a quantity as about 0.1 to 0.0001% by weight of the optical brightening compound with reference to the macromolecular end product.

As compared with the known optical brighteners, the optical brightening compounds herein described have the advantage that they are absolutely or, at any rate, outstandingly stable at the temperatures used in polymerization and working up. They do not crystallize out in the macromolecular products and also cannot any longer be dissolved out from them. Even optical brighteners of the abovementioned kind which are not insoluble in water give an optical brightening effect which is stable to washing. The fastness to light is also very good. Even after prolonged action of sunlight on the macromolecular products according to this invention, no reaction products which cause yellowing are formed from the optical brightening compounds. The macromolecular substances are suitable for example for molded articles, foils, threads and textiles.

The optical brightening compounds are so firmly embedded in the optically brightened polyamides and polyesters that it can be assumed that the optical brighteners are chemically combined with the polyamides and polyesters. If this assumption is correct, this would mean that in the condensation of the polyamide-forming substances and the optical brightening compounds or of the polyester-forming substances and the optical brightening compounds or in the incorporation of the optical brightening compounds into the polyamides or polyesters, there occur condensation or addition reactions between the optical brighteners and the macromolecular organic substances or their precursors or elementary units. Such reactions are possible between the carboxyl groups or their derivatives which are situated on the phenyl radicals of the styryl groups of the optical brighteners, with carboxylic acid or amino groups of polyamide-forming substances, with the amide groups in polyamides, with carboxyl groups or hydroxyl groups of the polyester-forming substances or with the ester groups of the polyesters. Condensation reactions of the said kind with the splitting off of water or addition reactions of nitrile groups lie within the realm of possibility. Condensation or addition reactions of the optical brightening compounds are also possible with polyvinyl compounds if these contain carboxyl, carboxylic acid amide, carboxylic acid ester or nitrile groups, as for example polymers of acrylic acid, acrylamide, acrylic acid esters, acrylonitrile or the corresponding methacrylic acid derivatives or vinyl esters. Since the optical brightening compounds are contained in the macromolecular substances only in very small amounts, the optically brightened macromolecular substances, if the above described reactions have in fact taken place, consist of mixtures of macromolecules with which no optical brightener is chemically combined and relatively small amounts of macromolecules with which optical brightener is chemically combined.

Although the optical brightener in the final products is so firmly combined with the macromolecular substances it has lost none of its excellent optical brightening action.

The constitutions of some of the optical brightening compounds falling within the scope of the present invention may be seen from the following table in which the meanings given in the table are to be attached to the symbols in the general formula:

sible. They may be prepared for example according to the process of Wittig's ylide synthesis from terephthalic aldehyde of the general formula:

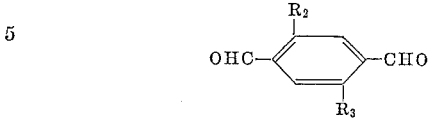

and benzyl halide derivatives of the general formula:

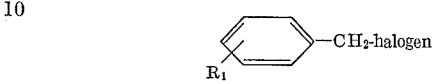

with the aid of triarylphosphines and proton acceptors according to the following reaction scheme which is given in respect to terephthalaldehyde, para-chlormethylbenzoic acid methyl ester, triphenylphosphine and sodium alcoholate:

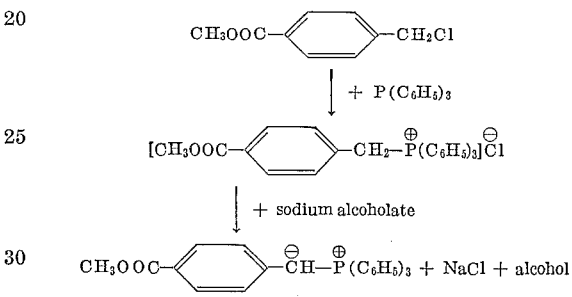

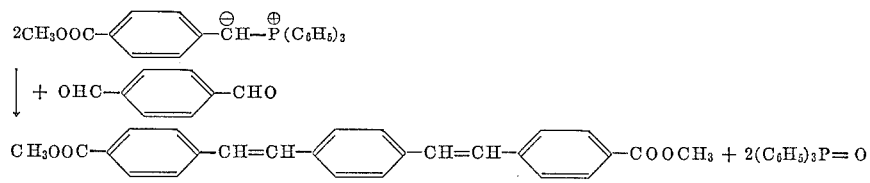

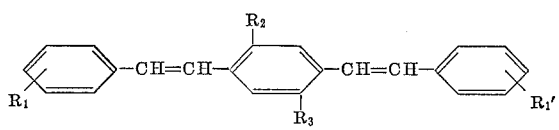

TABLE

| $R_1, R_1'$ | $R_2, R_3$ |
|---|---|
| —COO (e.g. salts with inorganic bases or amines). | H |
| —COOH | F |
| —COO-alkyl | Cl |
| —CONH$_2$ | Br |
| —CONH-alkyl | —CH$_3$ |
| —CON=(alkyl)$_2$ | —C$_2$H$_5$ |
| —CONH-cycloalkyl | —C$_3$H$_7$ |
| —CONalkylene | —C$_4$H$_9$ |
| —CN | —CH$_2$—C$_6$H$_5$ |
|  | —CCH$_3$ |
|  | —OC$_2$H$_5$ |
|  | —OC$_3$H$_7$ |
|  | —OC$_4$H$_9$ |

Instead of the alkyl radicals (preferably $C_nH_{2n+1}$ ($n$ being 1 to 4), there may be other aliphatic radicals, for example hydroxyalkyl, aminoalkyl, hydroxyalkoxyalkyl, or hydroxyalkylaminoalkyl radicals. The para and para' positions are mainly preferred, and secondly the meta and meta' positions and the ortho and ortho' positions.

Often 1,4-bis-styrylbenzenes are especially active which contain one substituent in para position and the other substitutent in meta' position, and mixtures which contain para, para' and meta, meta' substituted 1,4-bis-styrylbenzenes.

The optical brightening compounds are readily acces-

In this connection, reference may be made to the copending U.S. application Serial No. 534,156, filed September 13, 1955.

A suitable prescription is as follows:

18 parts by weight of para-chlormethylbenzoic acid methyl ester are stirred with 28 parts by weight of triphenylphosphine for 3 hours in dimethylformamide or dimethyl sulfoxide at about 80° C. 67 parts by weight of terephthalaldehyde are added and, after about 5 minutes, 55 parts by weight of sodium methylate. There are formed 155 parts by weight of 1,4-bis-(para-carbmethoxy-styryl)-benzene with the melting point from 315° C. with decomposition; ultraviolet spectrum: $\lambda_{max}$ 372 millimicrons: fluorescence spectrum: $\lambda_{max}$ 411, 435 millimicrons, both measured in dioxane.

By using para-chlormethylbenzonitrile instead of para-chlormethylbenzoic acid methyl ester in the above prescription, there is formed 1,4-bis-(para-cyanostyryl)-benzene with the melting point 278° to 280° C. and ultraviolet spectrum (measured in dioxane) $\lambda_{max}$ 411 and 433 millimicrons.

With meta-chlormethylbenzonitrile there is formed 1,4-bis-(meta-cyanostyryl)-benzene with the melting point 253° to 255° C. and the ultraviolet spectrum $\lambda_{max}$ 356 millimicrons and fluorescence spectrum $\lambda_{max}$ 392 and 412 millimicrons, both measured in dioxane.

With meta-chlormethylbenzoic acid esters there is formed 1,4-bis-(meta-carbmethoxystyryl)-benzene with the melting point 206° to 207.5° C., ultraviolet spectrum $\lambda_{max}$ 358 millimicrons, fluorescence spectrum $\lambda_{max}$ 392 and 412 millimicrons, both measured in dioxane.

The following examples will further illustrate this invention but the invention is not restricted to these ex-

Example 1

A solution of 0.2 gram of 1,4-bis-(para-carbmethoxystyryl)-benzene and 0.1 kilogram of hexamethylene diamine adipate in 1.9 kilograms of caprolactam, prepared at 180° C., is heated up under nitrogen in the course of 20 minutes while stirring to 210° C. and slowly cooled to 130° C. Into the melt thus condensed there is introduced for the purpose of delustring a suspension of 20 grams of titanium dioxide in 60 ccs. of water. When the delustring agent has been uniformly distributed in the melt, 273 milligrams of manganese acetate tetrahydrate in 10 ccs. of water are added. The melt is then heated for 16 hours at 265° C. in a vessel of corrosion-resistant steel while leading nitrogen thereover. A polymer melt is obtained having a k-value (according to Fikentscher) of 72. A sample withdrawn and cooled exhibits a strong blue fluorescence under a quartz lamp.

The melts is then supplied under a pressure of 2 atmospheres of nitrogen to a spinning pump with a delivery capacity of 15 ccs. per minute, forced through a sand filter in the usual way and then spun through a spinneret having 30 holes each with a diameter of 0.3 millimeter to form fine threads which are wound up at a speed of 200 meters per minute. After stretching and washing there are obtained fibers which are strongly optically brightened. The optical brightener cannot be removed by washing and furthermore no yellowing occurs in use. The fastness to light upon exposure to daylight under glass is 3; upon the fading of the optical brightener, no yellowing whatever takes place.

If the combination described above is spun without adding 1,4-bis-(para-carbomethoxystyryl)-benzene, a fiber is obtained which exhibits a marked yellowish appearance, caused by the manganese salt addition acting as protection of the macromolecular compound against deterioration under the influence of light.

Example 2

0.2 gram of 1,4-bis-(para-cyanostyryl)-benzene is dissolved at 120° C. in a mixture of 2.0 kilograms of caprolactam, 200 ccs. of water and 4 grams of titanium dioxide. The solution is placed in a closed reaction vessel of corrosion-resistant steel and heated within 2 hours to 265° C., the pressure, after it has reached 8 atmospheres, being kept constant by continuous pressure release. After the pressure of 8 atmospheres has been maintained for an hour, decompression to normal pressure is effected within another hour. The reaction mixture is then heated at 265° C. for 16 hours while leading pure nitrogen thereover, whereby polycondensation takes place. The polymer obtained has a k-value (according to Fikentscher) of 73. Molded articles, such as threads, injection moldings and the like, prepared therefrom have a very stable white shade.

Example 3

2.32 kilograms of hexamethylene diamine adipate and 2 kilograms of water are heated to 120° C., solution thereby taking place. 0.2 gram of 1,4-bis-(meta-carbomethoxystyryl)-benzene is added to the solution and then it is heated in an autoclave within 2 hours to such an extent that the water vapor pressure is 8 atmospheres. Within another 2 hours, while initially maintaining the pressure by decompression, the temperature is brought to 280° C. and then pressure release to atmospheric pressure is effected while keeping the temperature constant. The reaction product is further polycondensed for another 3 hours while leading pure nitrogen thereover. The polymer has a k-value (according to Fikentscher) of 70. Molded articles prepared therefrom fluoresce blue under a quartz lamp and have a dazzling white appearance in daylight. The brightening effect is not impaired by washing. The brightener does not yellow.

Example 4

1.43 kilograms of sebacic acid, 0.82 kilogram of hexamethylene diamine (as a 78% aqueous solution) and 0.2 gram of 1,4-bis-(para-carbomethoxystyryl)-benzene are placed in a reaction vessel of corrosion-resistant steel and heated to 270° C. while leading pure nitrogen thereover and distilling off the water. After a further 5 hours polycondensation, a polymer is obtained with a k-value of 78 and blue fluorescence.

The polymer prepared according to the invention and all molded articles therefrom appear white in comparison with a similar polymer which has been prepared without the addition of 1,4-bis-(para-carbomethoxystyryl)-benzene and which by reason of impurities of the sebacic acid used has a clearly yellow appearance. The white shade is very stable.

Example 5

0.20 gram of 1,4-bis-(para-cyanostyryl)-benzene is stirred at 120° C. into ditertiary-butyl-para-cresol, which serves as a heat stabilizer. After cooling, the mass is powdered and sieved through a sieve having 4,900 meshes per centimeter. The powder is dusted onto 2.0 kilograms of polycaprolactam shreds and worked up by a screw press at 280° C. into a wire 2 millimeters thick which is then cut up. Injection moldings prepared therefrom exhibit a white appearance, whereas molded articles which have been prepared under otherwise identical conditions but without 1,4-bis-(para-cyanostyryl)-benzene have a yellowish color in comparison therewith by the addition of ditertiary-butyl-para-cresol. The white shade is fast to washing and very stable.

Example 6

0.01% of 1,4-bis-(para-cyanostyryl)-benzene is dusted onto granulated polypropylene with a molecular weight of 135,000. This material is melted at 250° C. in screw press and forced by means of a spinning pump through a sand filter and a spinneret with 30 openings each of 0.3 millimeter diameter. The delivery capacity is 4.5 grams per minute. The threads are drawn off at a speed of 75 meters per minute, wound up and drawn while hot in two stages at the ratio of 1:12 in all. The brightening achieved is very striking and moreover very stable.

Similar results are obtained with the ortho, ortho' cyanostyryl derivative.

Example 7

2 kilograms of dimethyl terephthalate are converted into the high molecular weight polyester with 1.3 liters of ethylene glycol in the presence of 0.3 gram of zinc acetate and 0.4 gram of antimony trioxide as catalysts as well as 0.2 gram of 1.4-bis-(para-carbomethoxystyryl)-benzene while excluding oxygen and distilling off the methanol set free at temperatures up to 220° C. within 4 hours. Then the polycondensation is carried to completion within 4 hours after the addition of 10 grams of titanium dioxide suspended in 10 ccs. of ethylene glycol at temperatures rising up to 275° C. and pressure reduced down to 0.2 mm. Hg while stirring intensively. The polymer has a k-value (according to Fikentscher) of 55. Threads therefrom exhibit a beautiful white appearance.

Example 8

A mixture of 1.5% of titanium dioxide powder and 0.005% of finely powdered 1,4-bis-(para-carbmethoxystyryl)-benzene (percentages with reference to polypropylene) is dusted onto granulated polypropylene of molecular weight 185,000. The polymer is melted at 290° C. in a screw extruder and forced by means of a spinning pump through a sand filter and a spinneret having 30 holes, each of 0.3 mm. diameter. The pump has a delivery capacity of 10 grams per minute. The threads are drawn off at a speed of 500 meters per minute, wound up and drawn while hot at a rate of 1:4.5. The brightening achieved is very striking and stable.

*Example 9*

2000 grams of dimethyl terephthalate are converted into the high molecular weight polyester with 1320 ccs. of ethylene glycol in the presence of 0.3 gram of zinc acetate and 0.4 gram of antimony trioxide as catalysts as well as 0.2 gram of 1,4-bis-(para-cyanostyryl)-benzene at temperatures up to 220° C. within 4 hours while excluding oxygen and distilling off the methanol set free. Then the polycondensation is carried to completion within 4 hours after the addition of 10 grams of titanium dioxide suspended in 10 ccs. of ethylene glycol at temperatures rising up to 275° C. and a pressure reduced down to 0.2 mm. Hg while stirring intensively. The polymer has a $k$-value (according to Fikentscher) of 55. Threads therefrom exhibit a beautiful white appearance.

*Example 10*

300 parts of acetylated pulverulent polyformaldehyde of molecular weight 40,000 are impregnated with a solution of 45 parts of polyamide prepared from 33% of hexamethylene diamine adipate, 33% of caprolactam and 33% of para-diaminodicyclohexylmethane adipate as well as 6 parts of 2,2'-methylene-bis-(4-ethyl-6-tert.-butyl phenol) in methanol:benzene:water=7:2:1 and the solvent is evaporated while mixing continuously. The mixture obtained is dried under reduced pressure and one third thereof processed at 210° C. into a wire by means of a screw extruder having a delivery capacity of 7 grams per minute and a die with a diameter of 2.5 mm. 0.0005% with reference to polyformaldehyde of 1,4-bis-(4'-carbmethoxystyryl)-benzene is added to the second third of the mixture and 0.005% of bis-(4'-cyanostyryl)-benzene to the remaining third and the individual mixtures are processed separately in an extruder in the way described above. The wires prepared with styryl compounds exhibit no yellowing.

We claim:

1. An optically brightened synthetic organic polymer in which there is homogeneously incorporated a substituted 1,4-bis-styrylbenzene of the formula:

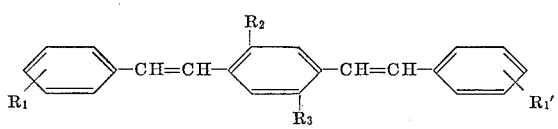

wherein $R_1$ and $R_1'$ each represents a substituent selected from the group consisting of —CN, —COOH, —COO—alkyl, —COO—cyclohexyl, —CONH$_2$, —CONH—alkyl, —CONH—cyclohexyl and —CON=(alkyl)$_2$ wherein the alkyl groups contain 1 to 4 carbon atoms, and wherein $R_2$ and $R_3$ each represents a substituent selected from the group consisting of hydrogen, alkyl, alkoxy and halogen, said $R_2$ and $R_3$ being limited to substituents which impart a maximum ultraviolet absorption value of not higher than 380 millimicrons and a fluorescence spectrum value between about 390 and 450 millimicrons, said values being measured as bands of maximum extinction in dioxane.

2. An optically brightened synthetic organic polymer as claimed in claim 1 wherein said polymer is selected from the group consisting of polystyrene, polyvinylchloride, polyacrylonitrile, polyolefines and fiber-forming linear polyesters and polyamides.

3. An optically brightened synthetic organic polymer as claimed in claim 1 wherein there is homogeneously incorporated in a fiber-forming linear polyamide a brightening amount of said 1,4-bis-styrylbenzene.

4. An optically brightened synthetic organic polymer as claimed in claim 1 wherein there is homogeneously incorporated in a fiber-forming linear polyester a brightening amount of said 1,4-bis-styrylbenzene.

5. An optically brightened synthetic organic polymer as claimed in claim 1 in which there is homogeneously incorporated a brightening amout of 1,4-bis-(para-carbomethoxystyryl)-benzene.

6. An optically brightened synthetic organic polymer as claimed in claim 1 in which there is homogeneously incorporated a brightening amount of 1,4-bis-(meta-carbomethoxystyryl)-benzene.

7. An optically brightened synthetic organic polymer as claimed in claim 1 in which there is homogeneously incorporated a brightening amount of 1,4-bis-(para-cyanostyryl)-benzene.

8. An optically brightened synthetic organic polymer as claimed in claim 1 in which there is homogeneously incorporated a brightening amount of 1,4-bis-(meta-cyanostyryl)-benzene.

9. An optically brightened synthetic organic polymer as claimed in claim 1 in which there is homogeneously incorporated a brightening amount of 1,4-bis-(ortho-cyanostyryl)-benzene.

10. An optically brightened synthetic organic polymer as claimed in claim 1 which contains the substituted 1,4-bis-styrylbenzene in an amount of about 0.0001 to 0.1% by weight.

11. An optically brightened synthetic fiber-forming linear polyamide in which there is homogeneously incorporated a brightened amount of 1,4-bis-(carboalkoxystyryl)-benzene of the formula

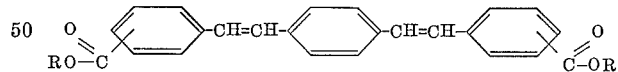

wherein R is alkyl of 1 to 4 carbon atoms.

12. An optically brightened synthetic fiber-forming linear polyamide in which there is homogeneously incorporated a brightening amount of 1,4-bis-(cyanostyryl)-benzene.

13. An optically brightened synthetic fiber-forming linear polyester in which there is homogeneously incorporated a brightening amount of 1,4-bis-(carboalkoxystyryl)-benzene of the formula

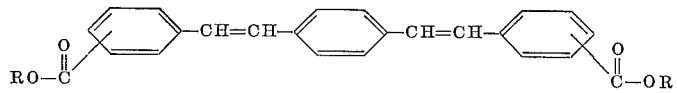

wherein R is alkyl of 1 to 4 carbon atoms.

14. An optically brightened synthetic fiber-forming linear polyester in which there is homogeneously incorporated a brightening amount of 1,4-bis-(cyanostyryl)-benzene.

15. An optically brightened synthetic polyolefine in which there is homogeneously incorporated a brightening amount of 1,4-bis-(carboalkoxystyryl)-benzene of the formula

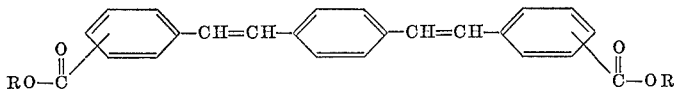

wherein R is alkyl of 1 to 4 carbon atoms.

16. An optically brightened synthetic polyolefine in which there is homogeneously incorporated a brightening amount of 1,4-bis-(cyanostyryl)-benzene.

17. An optically brightened synthetic thermoplastic polyformaldehyde in which there is homogeneously incorporated a brightening amount of 1,4-bis-(carboalkoxystyryl)-benzene of the formula

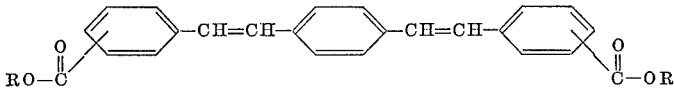

wherein R is alkyl of 1 to 4 carbon atoms.

18. An optically brightened synthetic thermoplastic polyformaldehyde in which there is homogeneously incorporated a brightening amount of 1,4-bis-(cyanostyryl)-benzene.

19. An optically brightened synthetic fiber-forming linear polyester in which there is homogeneously incorporated a brightening amount of 1,4-bis-(para-carbomethoxystyryl)-benzene.

20. An optically brightened synthetic fiber-forming linear polyester in which there is homogeneously incorporated a brightening amount of 1,4-bis-(para-cyanostyryl)-benzene.

References Cited by the Examiner

UNITED STATES PATENTS

| | | | |
|---|---|---|---|
| 2,723,197 | 11/1955 | Libby et al. | 96—88 XR |
| 2,747,997 | 5/1956 | Smith et al. | 96—82 XR |
| 2,992,206 | 7/1961 | Youle et al. | 260—40 XR |
| 3,062,814 | 11/1962 | Buell. | |
| 3,076,020 | 1/1963 | Stilz et al. | |
| 3,147,235 | 9/1964 | Zweidler et al. | |

OTHER REFERENCES

Pichat et al.: Journal de Chimie Physique, vol. 50, pp. 26–41 (1953).

Wittig et al.: German printed application, Ser. No. B 32741, pub. Feb. 23, 1956.

MORRIS LIEBMAN, *Primary Examiner.*

ALPHONSO D. SULLIVAN, MILTON STERMAN, LESLIE H. GASTON, ALEXANDER H. BRODMERKEL, *Examiners.*

G. C. HONEYCUTT, T. D. KERWIN, A. H. KOECKERT, *Assistant Examiners.*